United States Patent Office 3,549,433
Patented Dec. 22, 1970

3,549,433

METHOD OF PURIFYING ETCHED SILICON SURFACES

Theodor Renner, Nuremberg-Reichelsdorf, and Ludwig Mögele, Erlangen, Germany, assignors to Siemens Aktiengesellschaft, a corporation of Germany No Drawing. Filed July 2, 1968, Ser. No. 741,886
Claims priority, application Germany, July 5, 1967, S 110,675
Int. Cl. H01l 7/34
U.S. Cl. 148—186 4 Claims

ABSTRACT OF THE DISCLOSURE

The present invention relates generally to a method of purifying the surfaces of etched silicon bodies prior to the subsequent application and indiffusion of dopants. Primarily, it relates to the removal of chemical groups present in the etching solution, which have occupied the surface valences of the silicon, freed during etching. These chemical groups, which cannot be completely removed either by rinsing with water or heating, are removed by contacting with an aqueous iodine/potassium iodide solution.

The present invention relates generally to a method of purifying the surfaces of etched silicon bodies prior to the subsequent application and indiffusion of dopants. Primarily, it relates to the removal of chemical groups present in the etching solution, which have occupied the surface valences of the silicon, freed during etching. These chemical groups cannot be completely removed either by rinsing with water or heating. These chemical groups, however, must be removed since they present a homogeneous surface activation of the semiconductor. Such purifying methods are therefore necessary. The quality of semiconductor components as well as the output of a production method depend strongly upon this preprocessing of the semiconductor starting material, since the decisive sequence processe, such as diffusion, epitaxy, metal precipitation etc., are critically dependent on the surface.

It is known to immerse silicon surfaces, immediately following the etching process, into an anhydrous iodine/methanol or iodine/carbon tetrachloride solution, in order to remove from the surface oxide, hydroxide and fluoride groups (Journal of Electrochemical Society, September 1966, 956 to 958). The organic solvents used in the known method are unpleasant to handle due to their toxicity, the odor of the $CCl_4$ and due to the fire hazard connected with $CH_3OH$. Also, the iodine, which the known organic solvents contain in elemental form, is virtually unsuitable to loosen metal ions from silicon surfaces.

The known methods use anhydrous, organic solutions in order to provide oxide-free silicon surfaces for the subsequent diffusion. The prejudice that these solutions must be anhydrous may have been created through comparison tests wherein silicon wafers, purified with water, after etching, and subsequently steam oxidized, were found to have considerably inferior qualities to those which were treated with one of the aforenamed organic, iodine-containing solutions.

In the known method, it is frequently undesirably necessary that, immediately following the etching process, the silicon bodies be placed into the iodine bath where they must remain up to diffusion. Even, assuming that this type of storage will not have an adverse effect upon the electrical properties, it is still inconvenient and cumbersome to use liquid containers, especialy during transport.

An additional disadvantage of the known method is that fat-dissolving (organic) solvents are employed. It is virtually impressible to produce these solvents free of fat. Hence, in the known method, it cannot be avoided that the processed silicon surfaces will at least be coated with individual, even if very small, thin fat spots. This may result in the subsequent coating with doping material to be correspondingly irregular.

By contrast, the present invention comprises a method of purifying etched silicon surfaces by contact with an iodine solution, wherein the disadvantages of the known method are eliminated and the demand for free oxide may be abandoned. The present method also permits the removal of metal ions or compounds, or the remnants with metal ions bound at the silicon surface, which cannot be done with the known method. The purification should also be so effective that it may be started even shortly before diffusion, thus it is unnecessary for the silicon wafers to be immersed the entire period between etching and diffusion.

The present invention uses an aqueous iodine/potassium iodide solution ($I_2 \cdot KI$).

According to a further development of the invention for a method of oxidized indffusion of p-n junctions into chemically etched silicon surfaces, to which metal ions or compounds, or remnants with metal ions are bound, said surfaces are brought into contact with an aqueous iodine/potassium iodide solution and thereafter diffused in a flowing, oxidized carrier gas in an open diffusion furnace.

During the iodine processing, in accordance with the invention, the iodine takes the place of all components of the etching solution, bound to the free surface valences which result from the etching. During heating in the diffusion furnace, the iodine layer is removed uniformly without any chemical side reaction so that the resultant silicon surface is chemically defined and homogeneously activated.

A particular advantage of the present invention is that the silicon does not have to be treated with the iodine solution immediately after the etching, but that the iodine treatment may be effected a short time prior to diffusion, for example 5 to 10 minutes earlier.

With the help of the present invention, not only $F^-$ and $OH^-$ ions and HOH deposits, stemming from the etching solution are removed from the silicon surface, but also metal ions, such as copper and iron. The latter are complexed by the $I_2 \cdot KI$. The metal complexes are water soluble and start dissolving while iodine remains on the silicon. On the other hand, when organic iodine solutions are used, the metal ions are virtually undissolved, which makes the known method unsuitable for cleaning the etched silicon surfaces, since no complexing of metal ions can take place. An organic solution with iodine complexes could not improve the known method either, because of their insolubility in $CH_3OH$ or $CCl_4$, the metal complexes cannot be removed from the silicon.

The content of $I_2 \cdot KI$ in the solution of the present invention does not have to be exactly adjusted. The lower limit of $I_2 \cdot KI$ is approximately at the point where just enough iodine remains in the solution, so that the displacement reaction is more or less quantitative. On the other hand, enough $I_2 \cdot KI$ may be present in the solution so that the same may just about be considered to be aqueous and/or that the formed metal complexes can start to dissolve.

The method of the present invention also utilizes with advantage the fact that the speed of each chemical reaction increases with the temperature. The aqueous solution with the complex bound iodine, in contrast to $CCl_4$ or $CH_3OH$ solutions with elemental iodine, may be heated without boiling to approximately 100° C. (boiling point increase) without causing evaporation of the iodine. The above and the advantageous characteristics of the $I_2 \cdot KI$ complex with respect to the displacement of disturbing groups on the etched silicon, by means of iodine make possible the use of the treatment shortly before etching. This is particularly favorable in large-scale production where it is undesirable to set up the diffusion installation in the vicinity of the aforegoing processing installation.

The invention will now be disclosed in greater detail with embodiment examples.

EXAMPLE 1

A series of p-doped silicon discs with a 20 x 20 $mm.^2$ surface, and 0.4 mm. thick, and with about 10Ω cm. specific resistance, are etched with potassium hydroxide (KOH). Thereafter, a portion of the wafers were placed for 5 minutes into an aqueous 10% $I_2 \cdot KI$ solution. Subsequently, all discs are diffused, in an open phosphorus diffusion furnace (open tube system) at 870° C. and 1 atm. for about one half hour, with $P_2O_5$.

EXAMPLE 2

The test according to Example 1 is repeated, etching with $HNO_3/HF$ instead of KOH.

EXAMPLE 3

The test according to Example 1 is repeated with an aqueous, 30% $I_2 \cdot KI$ solution, instead of the 10% solution.

In all tests, the silicon wafers not processed in accordance with the invention, were coated with doping material. They also had spots. The inhomogeneity was clearly visible even with the naked eye from the interference colors of layers with different thicknesses.

Though the method of the present invention has general merit, it is still particularly advantageous in the production of large-area p-n junctions which are to lie relatively close to the semiconductor surface. Hence, the method has shown excellent results in the production of solar cells and in power-mesa devices.

We claim:

1. The method of purifying etched silicon surfaces which comprises contacting silicon bodies with an aqueous iodine/potassium iodide solution ($I_2 \cdot KI$).

2. The method of claim 1 for purifying chemically etched silicon surfaces to which metal ions or compounds, or remnants with metal ions are bound, to be used for indiffusion of p-n junctions, wherein the chemically etched surface is contacted with an aqueous iodine/potassium iodide solution and subsequently diffused.

3. The method of claim 1 wherein the surface is treated with the iodine solution immediately prior to diffusion.

4. The method of claim 1 wherein an aqueous iodine/potassium iodide solution heated to about 100° C. is used.

References Cited

UNITED STATES PATENTS 3,436,284 4/1969 Klein ---------------- 156—17

L. DEWAYNE RUTLEDGE, Primary Examiner

R. A. LESTER, Assistant Examiner

U.S. Cl. X.R.

134—2; 148—1.5, 187; 156—17